United States Patent [19]

Altes

[11] Patent Number: 5,619,537
[45] Date of Patent: Apr. 8, 1997

[54] MAXIMUM A POSTERIORI DECODER FOR DIGITAL COMMUNICATIONS

[75] Inventor: Richard A. Altes, La Jolla, Calif.

[73] Assignee: Chirp Corporation, La Jolla, Calif.

[21] Appl. No.: 497,888

[22] Filed: Jul. 3, 1995

Related U.S. Application Data

[63] Continuation of Ser. No. 367,748, Jan. 3, 1995, abandoned, which is a continuation of Ser. No. 225,741, Apr. 11, 1994, abandoned, which is a continuation of Ser. No. 607,582, Nov. 1, 1990, Pat. No. 5,303,269.

[51] Int. Cl.$^6$ .................................................. H03D 3/00
[52] U.S. Cl. ........................................ 375/322; 375/324
[58] Field of Search .................................. 375/322, 324, 375/330, 340, 343, 262; 371/43

[56] References Cited

U.S. PATENT DOCUMENTS

| | | | |
|---|---|---|---|
| 4,187,719 | 2/1993 | Birgenheier et al. | 375/94 |
| 4,554,509 | 11/1985 | Cornett | 329/105 |
| 4,656,648 | 4/1987 | Vallet | 375/80 |
| 4,660,166 | 4/1987 | Hopfield | 364/807 |
| 4,719,591 | 1/1988 | Hopfield et al. | 364/807 |
| 4,809,193 | 2/1989 | Jourjine | 364/513 |
| 4,847,871 | 7/1989 | Matsushita et al. | 375/94 |
| 4,873,661 | 10/1989 | Tsividis | 364/807 |
| 4,885,757 | 12/1989 | Provence | 375/96 |
| 5,081,645 | 1/1992 | Resnikoff et al. | 375/96 |
| 5,303,269 | 4/1994 | Altes | 375/322 |

OTHER PUBLICATIONS

"Maximum Posterior Probability Demodulation of Angle–Modulated Signals", D.W. Tufts and J.T. Francis, IEEE Transactions on Aerospace and Electronic Systems, vol. AES–15, No. 3, Mar. 1979, pp 219–227.

"Electronic Implementation of Associative Memory Based on Neural Network Models", A. Moopenn, John Lambe, and A.P. Thakoor, IEEE Transactions on Systems, Man and Cybernetics, vol. SMC–17, No. 2, Mar.–Apr., 1987, pp. 325–331.

"Programmable Synaptic Devices for Electronic Neural Nets", A. Moopenn and A.P. Thakoor, Proc. 5th IASTED Int'l Conf. on Expert Systems and Neural Networks, Aug., 1989, pp. 36–40.

"Optical Implementation of the Hopfield Model", N.H. Farhat, D. Psaltis, A. Prata, and E. Paek, Applied Optics 24 (1985), pp. 1469–1475.

"Simple 'Neural' Optimization Networks: An A/D Converter, Signal Decision Circuit, and a Linear Programming Circuit", David W. Tank and John J. Hopfield, IEEE Transactions on Circuits and Systems, vol. CAS–33, No. 5, May, 1986, pp. 533–541.

"Unconstrained Minimum Mean–Square Error Parameter Estimation with Hopfield Networks", Richard A. Altes, IEEE International Conference on Neural Networks, San Diego, California, Jul., 1988.

John D. Provence—Proceeding of 1988 IEEE International Sympoisum on Circuits and Systems; pp. 2382 through 2385; Dated Jun. 7–9, 1988; Title: Neural Network Implementation for an Adaptive Miximum–Likelihood Receiver.

Peterson, W. Wesley, *Error–Correcting Codes*, MIT Press, Cambridge, Mass., 1961, pp. 137–182.

Proakis, John G., *Digital Communications*, 2nd Ed., McGraw–Hill, New York, 1989, pp. 429–432.

*Primary Examiner*—Stephen Chin
*Assistant Examiner*—T. Ghebretinsae
*Attorney, Agent, or Firm*—Knobbe, Martens, Olson & Bear

[57] ABSTRACT

A system and method for decoding by identification of the most likely phase coded signal corresponding to received data. The present invention has particular application to communication with signals that experience spurious random phase perturbations. The generalized estimator-correlator uses a maximum a posteriori (MAP) estimator to generate phase estimates for correlation with incoming data samples and for correlation with mean phases indicative of unique hypothesized signals. The result is a MAP likelihood statistic for each hypothesized transmission, wherein the highest value statistic identifies the transmitted signal.

20 Claims, 3 Drawing Sheets

MAXIMUM A POSTERIORI DECODER FOR DIGITAL COMMUNICATIONS

STATEMENT REGARDING GOVERNMENTAL RIGHTS

The present invention was made with support from the United States Government under Contract Nos. NAS3-26959, NAS3-26391 awarded by the National Aeronautics and Space Administration (NASA). The Government has certain rights in the invention.

RELATED APPLICATION

This application is a continuation of U.S. patent application Ser. No. 08/367,748, filed Jan. 3, 1995, now abandoned, which was a continuation of U.S. patent application No. 08/225,741, filed Apr. 11, 1994, now abandoned, which was a continuation-in-part of U.S. patent application No. 07/607,582, filed Nov. 1, 1990, which is now U.S. Pat. No. 5,303,269.

BACKGROUND OF THE INVENTION

1. Field of the Invention

The present invention relates to communications systems and, more particularly, to digital signal decoders.

2. Description of the Related Technology

Most electronic communication systems in use today include a transmitter to transmit an electromagnetic signal and a receiver to receive the transmitted signal. The transmitted signal is typically corrupted by noise and, therefore, the receiver must operate with received data that reflects the combination of the transmitted signal and noise. Thus, the receiver receives data y(t) at a time t, where y(t)=s(t)+n(t), the sum of the transmitted signal and additive noise. The received data equation can be expanded as follows:

$$y(t) = \sqrt{2}\, A(t)\cos[\omega_o t + \theta(t)] + n(t)$$

where A(t) is the signal amplitude, $\omega_o$ is the carrier or reference frequency, $\theta$(t) is the time-varying phase function and n (t) is noise.

Many of these communication systems require that the receiver demodulate information in the received signal which depends on proper demodulation of the signal phase angle at all times during transmission. The demodulation of the signal phase angle is problematic in view of the pervasiveness of noise. Therefore, for this class of receivers it is desirable to optimize phase demodulation, which is equivalent to optimizing an estimation of the phase function $\theta$ (t).

Digital communication involves modulation that changes discontinuously in accordance with a transmitted coded signal, e.g., discontinuous phase shifts of a sequence of short-duration sinusoids (chip waveforms), as in quadrature phase shift keying (QPSK). Each coded signal represents a transmitted quantization level or symbol. One example type of coded signal is a maximum length binary sequence (W. W. Peterson, *Error-Correcting Codes*, MIT Press, Cambridge, Mass., 1961). Such a coded signal is a binary stream which is generated by a decorrelated cyclic shift, i.e., each coded signal is designed to be uncorrelated with any another. Coded signal transmission is used today in many communications domains including, for example, digital cellular telephone systems.

Uncompensated multipath, synchronization errors, and phase disparity between transmitter and receiver cause a received code to have phase values that are different from those of the transmitted code, even without additive noise. The differences between received and transmitted phase samples can be modeled as random perturbations that are correlated from sample to sample. A conventional maximum likelihood (correlation) receiver does not account for such noise-free randomness; received noise-free samples are assumed to have the same phase values as the transmission for correlation processing. Thus, a need exists for an optimum receiver/demodulator for digital transmission in the presence of such errors.

The maximum a posteriori (MAP) estimator uses each phase value in a hypothesized coded signal as an element of the prior mean phase vector $\underline{\theta}_m$. For the same data, different MAP phase estimates are obtained for different hypothesized signals. The set of MAP phase estimates corresponding to a given hypothesized coded signal determines a reference signal for correlation with the original data.

The resulting receiver performs better than a conventional maximum likelihood processor for phase perturbed signals, but a different $\underline{\theta}_m$ vector and associated MAP phase estimate is needed for each coded signal hypothesis. For many coded signal hypotheses, receiver complexity for MAP estimator-correlator processing seems to be prohibitive. Thus, a need exists for a simple implementation of a MAP estimator-correlator receiver for digital communications.

SUMMARY OF THE INVENTION

The problem of optimal demodulation can be addressed with a maximum a posteriori (MAP) formulation, with a prior phase distribution that has nonzero covariance. Assuming that phase perturbations have zero mean value, the prior phase distribution has a mean phase vector corresponding to the transmitted coded signal and a covariance matrix corresponding to the covariance of the phase perturbations caused by multipath, synchronization, and/or phase disparity between transmitter and receiver. The prior mean phase values in a MAP demodulator thus correspond to the phase values in a hypothesized coded signal.

A correlation receiver that compares received phase shifts with hypothesized coded signals (or performs equivalent operations on in-phase and quadrature (I,Q) components) is suboptimum for random phase perturbations that are not caused by additive noise. For noise-independent random phase perturbations, the correlator should be replaced by a MAP version of a generalized estimator-correlator that first forms MAP phase estimates $\hat{\theta}$ (using received phase shifts and hypothesized coded signals) and then correlates these estimates with the received phase shifts and hypothesized coded signals using the MAP likelihood statistic $$\begin{aligned}
l_{MAP}(k) &= \ln[p(r|\hat{\underline{\theta}}_m)p(\hat{\underline{\theta}}_m|\underline{\theta}_{mk})] \\
&= -\frac{1}{2\sigma_n^2} \sum_{i=1}^{N} \{A^2(i\Delta) + |r(i\Delta)|^2 - \\
&\quad 2A(i\Delta)|r(i\Delta)|\cos[\hat{\theta}_k(i\Delta) - \alpha(i\Delta)]\} - \\
&\quad \frac{1}{2} \sum_{i=1}^{N}\sum_{j=1}^{N} [\hat{\theta}_k(i\Delta) - \\
&\quad \theta_{mk}(i\Delta)]^T [C_\theta^{-1}]_{ij} [\hat{\theta}_k(j\Delta) - \theta_{mk}(j\Delta)],
\end{aligned}$$

where p $(r|\hat{\underline{\theta}}_k)$ and p $(\hat{\underline{\theta}}_k|\underline{\theta}_{mk})$ are conditional probability density functions, $r(i\Delta)=|r(i\Delta)|\exp[j\alpha(i\Delta)]$, i=1, ..., N is the sampled received signal, $C_\theta$ is the phase covariance matrix, the index k refers to the $k^{th}$ hypothesized coded signal, $\theta_{mk}$ is the mean phase vector for the $k^{th}$ coded signal and the MAP estimates $$\hat{\underline{\theta}}_k = [\hat{\theta}_k(\Delta) \ldots \hat{\theta}_k(N\Delta)]^T$$

satisfy the equation $$\hat{\theta}_k(i\Delta) - \theta_{mk}(i\Delta) = \sigma_n^{-2} A \sum_{j=1}^{N} |r(j\Delta)| R_0| (i-j)\Delta | \sin[\alpha(j\Delta) - \hat{\theta}_k(j\Delta)],$$

$i=1, \ldots, N$, where $R_0[(i-j)\Delta]$ corresponds to the element in row i and column j of the phase covariance matrix $C_0$. When $R_0[(i-j)\Delta]$ equals zero, the MAP estimator yields the prior mean phase estimates $\underline{\theta}_m$ and the generalized estimator-correlator becomes an ordinary correlator.

A simpler estimator-correlator configuration was introduced in the original patent application in conjunction with a classifier that discriminates between signals with different phase covariance functions, $R_0(.)$. The present invention discriminates between phase-perturbed coded signals with different mean phase values corresponding to the transmitted phase values of each signal. The coded signal discriminator uses a generalized version of the estimator-correlator configuration, as described in the above equations.

The complexity of a generalized estimator-correlator receiver can be reduced by exploiting the cyclic property of many block codes, e.g., Reed-Solomon codes. If a length N code is cyclic, a sequence of N-1 cyclic shifts of a given coded signal can generate all the other signals in the code. For a unit cyclic shift to the right, the last element in a shift register is moved to the first position, and all other elements are shifted to the right by one position.

A single estimator-correlator can test all N coded signals in a length N cyclic code where the convergence time of the MAP estimator is assumed to be less than or equal to the sampling interval $\Delta$. This requirement is also implicit in a block processor that moves a block by one sampling interval for each MAP phase estimate. After $N\Delta$ seconds, the N sample input buffer is filled with samples corresponding to the next coded signal. During the same time, N cyclic shifts of a hypothesized coded signal yield N sets of MAP phase estimates to be used in a generalized estimator-correlator. The largest estimator-correlator output designates the best hypothesis for the current coded signal. Phase samples of the next received signal are transferred to the estimator-correlator via a parallel set of connections between each element of the input buffer and the corresponding element of the data shift register. A conventional maximum likelihood demodulator can exploit the same principle as the MAP demodulator.

In summary, the present invention utilizes phase values of a hypothesized coded signal as the prior mean phase vector in a generalized MAP estimator-correlator demodulator for digital communication with random phase perturbations. Random phase perturbations are introduced by synchronization (timing) errors, uncompensated multipath, and uncompensated phase shift between transmitter and receiver. The present invention also utilizes recirculating shift registers for efficient implementation of ML and MAP demodulators for cyclic codes.

These and other objects and features of the present invention will become more fully apparent from the following description and appended claims taken in conjunction with the accompanying drawings.

DETAILED DESCRIPTION OF THE PREFERRED EMBODIMENTS

Figure 1:
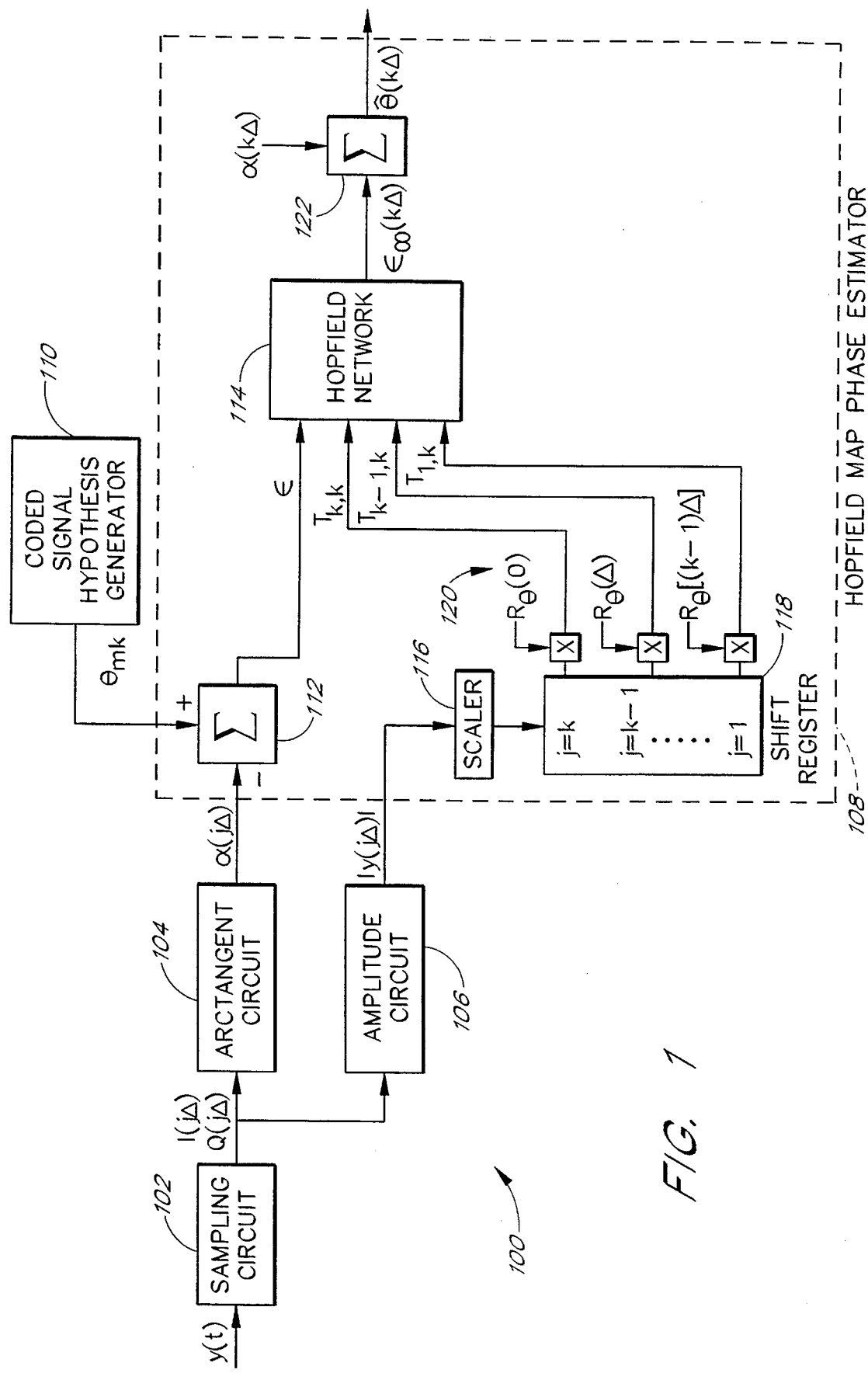
FIG. 1 is a block diagram of one presently preferred embodiment of a maximum a posteriori (MAP) phase angle demodulator using a Hopfield network.

FIG. 1 illustrates one preferred embodiment of a maximum a posteriori (MAP) demodulator 100. The background of a general implementation for the MAP demodulator 100 can be found in the co-pending parent application, now U.S. Pat. No. 5,303,269, which is hereby incorporated by reference.

Essentially, the MAP demodulator 100 receives a phase modulated signal such as, for example, an FM broadcast signal. A sampling circuit 102 periodically samples the integrated products of the received signal y(t) with two local oscillator signals, $\cos(\omega_0 t)$ and $\sin(\omega_0 t)$, where $\omega_0$ is the carrier frequency. The products of y(t) cos $\omega_0$ and y(t) sin $\omega_0$ are integrated over an interval $\Delta$, and the integrator outputs are sampled at intervals of $j\Delta$, $j=1, \ldots, N$, to generate sampled in-phase and quadrature components, $I(j\Delta)$ and $Q(j\Delta)$, $j=1, \ldots, N$. The sampled components are fed into an arctangent circuit 104 and an amplitude circuit 106. The arctangent circuit 104 performs the function arctan(Q/I), where the received signal comprises in-phase (I) and quadrature (Q) components, to provide a time series of phase samples $\alpha(j\Delta)$. The amplitude circuit 106 outputs a time series of sample amplitudes $|y(j\Delta)|$. The N sample phases and amplitudes from the circuits 104,106 are fed into a Hopfield MAP phase estimator 108. The MAP estimator 108 also receives N predicted mean phase values $\theta_m(j\Delta)$, $j=1, \ldots, N$. The MAP estimator 108 provides a block of N estimated phase values $\hat{\theta}(k\Delta)$, $k=1, \ldots, N$ at its output. One of the N samples in the output block is shown at the output of the phase estimator 108. Thus, the desired goal of the MAP demodulator 100 is to achieve an accurate estimate of the phase sequence of the received signal y(t).

A coded signal hypothesis generator 110 generates the prior mean phase for a particular coded signal k, $k=1 \ldots K$, which is fed into the MAP phase estimator 108. The generator 110 may also generate code word amplitudes. However, for the purpose of explaining the general demodulator 100, this aspect is not shown in FIG. 1 as it will be discussed below with respect to FIG. 3.

The presently preferred MAP estimator 108 is structurally arranged as follows. A summing amplifier 112 accepts the phase samples from the arctangent circuit 104 and subtracts each sample from a corresponding predicted mean phase and provides the result to a Hopfield network 114. Phase differences $\{\alpha(j\Delta)-\theta_{mk}(j\Delta)\}$ are constrained to lie between $-\pi$ and $\pi$ by addition of $2\pi$, 0, or $-2\pi$ to relevant $\alpha$-samples. The Hopfield network 114 also receives amplitude samples corresponding to the input signal after, optionally, processing the signal via a scaling circuit 116. Shift register 118 and the multipliers 120 which multiply signal amplitude samples by corresponding samples of the autocovariance function $R_0[(k-j)\Delta]$. The output of the Hopfield network 114 is fed into a summing amplifier 122 to result in the phase estimate $\hat{\theta}(k\Delta)$, the end product of the demodulator 100.

For analog communication, maximum a posteriori (MAP) phase estimation is sufficient for demodulation. Digital systems, however, require a hypothesis test to decide between transmitted coded signals, bits, or quantized chip waveform phase shifts. MAP phase estimates can be used to replace a computationally expensive optimum hypothesis test that involves multidimensional integration of the product of two multivariate probability distributions. The generalized estimator-correlator requires that the vector $\hat{\underline{\theta}}_k$ of MAP phase estimates be correlated with both the preliminary (maximum likelihood) phase estimate vector $\underline{\alpha}$ (as in an estimator-correlator) and with the prior or reference phase vector $\underline{\theta}_{mk}$.

To understand the structure and function of the present invention it is helpful to see the mathematical derivation of a coded signal hypothesis test. The hypothesis test is implemented in order to decide which of K transmitted phase vectors $\{\underline{\theta}_{mk}, k=1, \ldots, K\}$ is most likely, based on a received complex data vector E and a prior phase distribution describing phase uncertainty that could be caused by a rapidly time varying, unequalized communication channel and/or system errors (e.g., imperfect synchronization and spurious phase shifts). If all the coded signal mean phase vectors $\{\underline{\theta}_{mk}\}$ are equally likely a priori, the most likely $\underline{\theta}_{mk}$ maximizes the likelihood function $p(\underline{r}|\underline{\theta}_{mk})$, $k=1, \ldots, K$.

The hypothesis test accounts for channel/system induced uncertainty in the received $\underline{\theta}$-vector by integrating over all possible received $\underline{\theta}$-vectors, weighted by their prior probabilities;

$$p(\underline{r}|\underline{\theta}_{mk})=\int \ldots \int p(\underline{r}|\underline{\theta}) p(\underline{\theta}|\underline{\theta}_{mk})d\underline{\theta}. \quad (1)$$

The multidimensional integral in Equation (1) integrates each component of $\underline{\theta}$ over a $2\pi$ interval, where $$\underline{\theta}^T=[\theta(\Delta)\theta(2\Delta) \ldots \theta(N\Delta)] \quad (2)$$

and the sampling interval $\Delta$ represents the duration of a constant frequency, phase shifted "chip" waveform in a PSK signal.

The multivariate probability distributions in Equations (1) are $$p(r|\underline{\theta})=[(2\pi)^{N/2}|C_n|^{1/2}]^{-1}\exp[-(\frac{1}{2})(r-\underline{s}_\theta)^T C_n^{-1}(r-\underline{s}_\theta)] \quad (3)$$

and $$p(\underline{\theta}|\underline{\theta}_{mk})=[(2\pi)^{N/2}|C_\theta|^{1/2}]^{-1}\exp[-(\frac{1}{2})(\underline{\theta}-\underline{\theta}_{mk})^T C_\theta^{-1}(\underline{\theta}-\underline{\theta}_{mk})] \quad (4)$$

where the $i^{th}$ components of, the sampled received data time series, and $\underline{s}_0$, the transmitted signal function, are $$r(i\Delta)=|r(r\Delta)|\exp[i\alpha(i\Delta)] \quad (5)$$

and $$\underline{s}_0(i\Delta)=A(i\Delta)\exp[j\theta(i\Delta)] \quad (6)$$

respectively.

A maximum likelihood phase estimate computes the phase of $\underline{s}\theta$ in Equation (6) that maximizes the conditional probability $p(\underline{r}|\underline{\theta})$ of signal $\underline{r}$ given phase $\underline{\theta}$ in Equation (3), and this phase vector is the same as $\underline{\alpha}$ in Equation (5). The phase covariance matrix $C_0$ in Equation (4) describes the deviation of received phase values from their expected values, and is associated with unequalized or randomly time varying channel effects or system errors.

A simpler implementation of a hypothesis test based on the likelihood function in Equation (1) is based on the following observation: In additive, white noise, the $\underline{\theta}_{mk}$-vector that maximizes the likelihood function $p(\underline{r}|\underline{\theta}_{mk})$ in Equation (1) is also the $\underline{\theta}_{mk}$-vector that maximizes $p(\underline{r}|\hat{\underline{\theta}}_k)p(\hat{\underline{\theta}}_{k}|\underline{\theta}_{mk})$, where $\hat{\underline{\theta}}_k$ is the MAP $\underline{\theta}$-estimate corresponding to $\underline{\theta}_{mk}$.

Let phase sequence $\underline{\theta}_{mj}$ be the most likely hypothesis obtained via multivariate integration;

$$\int \ldots \int p(\underline{r}|\underline{\theta})p(\underline{\theta}|\underline{\theta}_{mj})d\underline{\theta} = \left\{ \begin{array}{c} \max \\ \underline{\theta}_{mk} \end{array} \right\} [\int \ldots \int p(\underline{r}|\underline{\theta})p(\underline{\theta}|\underline{\theta}_{mk})d\underline{\theta}] \quad (7)$$

where $C_n = \sigma_n^2 I$ and the integration limits are $$\{\alpha(i\Delta)-\pi, \Delta(i\Delta)+\pi; i=1, \ldots, N\}. \quad (8)$$

Let $\underline{\theta}_{mn}$ be the chosen hypothesis obtained by substituting the MAP phase estimate into the integrand in Equation (7);

$$p(\underline{r}|\hat{\underline{\theta}}_n)p(\hat{\underline{\theta}}|\underline{\theta}_{mn})| = \left\{ \begin{array}{c} \max \\ \underline{\theta}_{mk} \end{array} \right\} [p(\underline{r}|\hat{\underline{\theta}}_k)p(\hat{\underline{\theta}}_k|\underline{\theta}_{mk})] \quad (9)$$

where the MAP phase estimate $\hat{\underline{\theta}}_k$ is the $\underline{\theta}_{mk}$-vector that maximizes $p(\underline{r}|\underline{\theta})p(\underline{\theta}|\underline{\theta}_{mk})$. It can be shown that $\underline{\theta}_{mn}$ equals $\underline{\theta}_{mj}$, i.e., that the hypothesis based on the MAP estimate is the same as the most likely hypothesis.

Replacement of $p(\underline{r}|\underline{\theta}_{mk})=\int \ldots \int p(\underline{r}|\underline{\theta}) p(\underline{\theta}|\underline{\theta}_{mk})d\underline{\theta}$ in Equation (7) by the simpler statistic in Equation (9) is important because evaluation of the multivariate distributions for all $\underline{\theta}$-samples and integration over all such samples is computationally burdensome unless $C_\theta$ is a diagonal matrix. Determination of the MAP phase estimate $\hat{\underline{\theta}}_k$ for each transmitted phase hypothesis $\underline{\theta}_{mk}$ may also be infeasible unless an analog Hopfield network (or a parallel set of K such networks for $\underline{\theta}_{ml}, \ldots, \underline{\theta}_{mK}$) is used to solve the equations $$\hat{\theta}_k(i\Delta) - \theta_{mk}(i\Delta) = \sigma_n^{-2} \sum_{j=1}^{N} A(j\Delta)|r(j\Delta)|R_0[(i-j)\Delta]\sin[\alpha(j\Delta) - \hat{\theta}_k(j\Delta)], \quad (10)$$

$$i = 1, \ldots, N, k = 1, \ldots, K.$$

Computation of the MAP based test statistic $p(\underline{r}|\hat{\underline{\theta}}_k)p(\hat{\underline{\theta}}_k|\underline{\theta}_{mk})$ involves a generalized correlation operation. Maximization of the statistic over $\{\underline{\theta}_{mk}; k=1, \ldots, K\}$ is equivalent to finding the $\underline{\theta}_{mk}$ vector that maximizes $$\ln[p(\underline{r}|\hat{\underline{\theta}}_k)p(\hat{\underline{\theta}}_k|\underline{\theta}_{mk})] = \quad (11)$$

$$-\frac{1}{2\sigma_n^2} \sum_{i=1}^{N} \{A^2(i\Delta) + |r(i\Delta)|^2 -$$

$$2A|r(i\Delta)|\cos[\hat{\theta}_k(i\Delta) - \alpha(i\Delta)]\} -$$

$$\frac{1}{2} \sum_{i=1}^{N} \sum_{j=1}^{N} [\hat{\theta}_k(i\Delta) - \theta_{mk}(i\Delta)] [C_\theta^{-1}]_{ij}[\hat{\theta}_k(j\Delta) - \theta_{mk}(j\Delta)].$$

The first expression on the right hand side of Equation (11) is maximized by maximizing the output of an estimator-correlator that computes $$Re \left\{ \sum_{i=1}^{N} |r(i\Delta)|e^{j\alpha(i\Delta)} \times A(i\Delta)e^{-j\hat{\theta}_k(i\Delta)} \right\} \quad (12)$$

The second expression on the right hand side of Equation (11) is proportional to a different correlation operation involving the MAP phase estimate, i.e., $$\hat{\underline{\theta}}_k^T C_\theta^{-1} \underline{\theta}_{mk}. \quad (13)$$

The estimator-correlator in the original patent application can be distinguished from that of the present invention, since it discriminates between processes with different covariance functions, e.g., speech vs. music, rather than between sequences with different prior mean phase vectors, e.g., different coded signals, as considered here.

Figure 2:
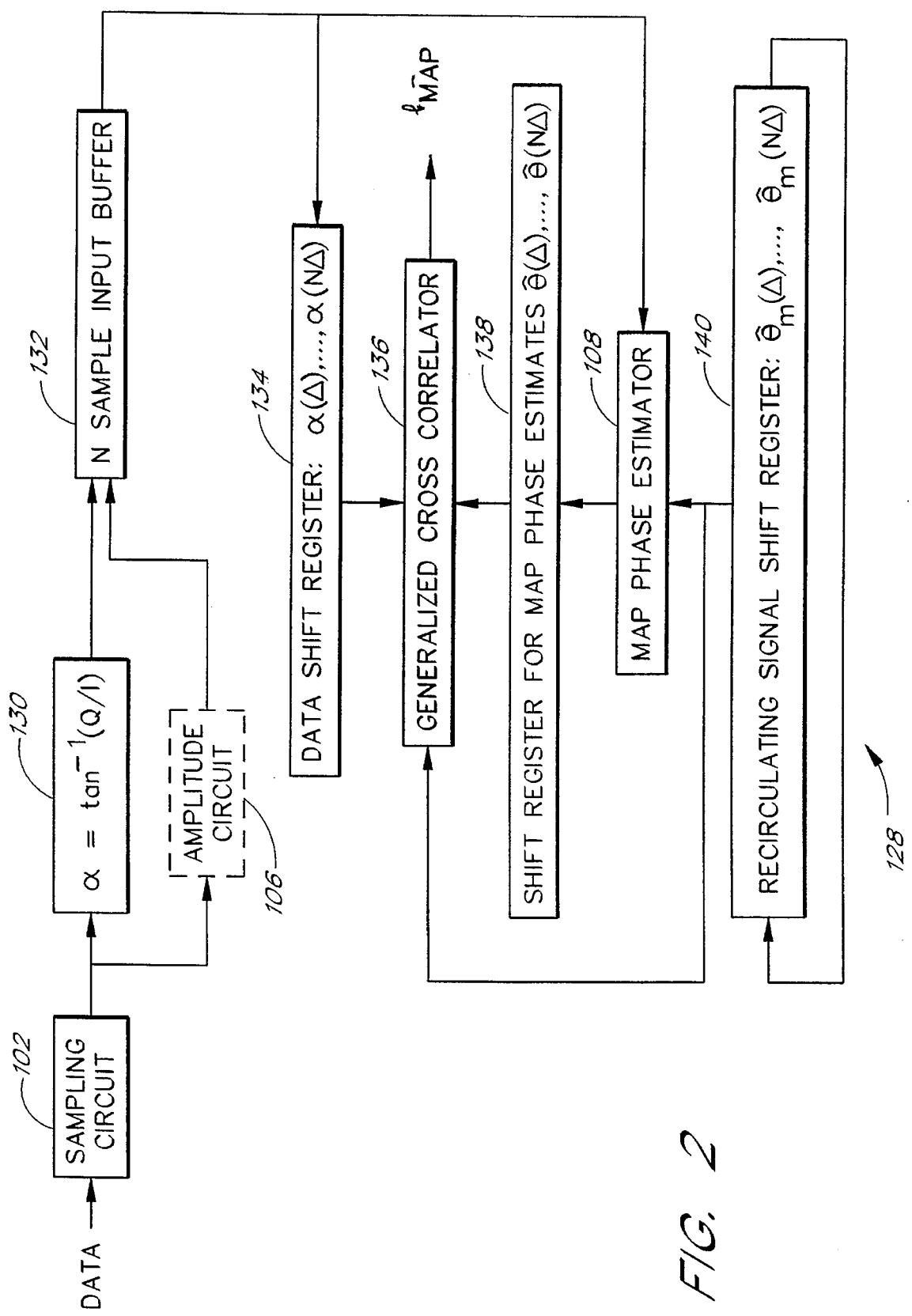
FIG. 2 is a block diagram of a MAP decoder of the present invention, including a MAP phase estimator as shown in FIG. 1, for a length N cyclic code, assuming uniform amplitude $|r|=[I^2+Q^2]^{1/2}$.

FIG. 2 illustrates a block diagram of a MAP decoder 128, of the present invention, for a length N cyclic code, assuming uniform amplitude $|r|=[I^2+Q^2]^{1/2}$. The coded signal decision corresponds to the shift in the recirculating signal shift registers that yields maximum correlator response $l_{MAP}$, which is the MAP likelihood function.

The MAP decoder 128 shown in FIG. 2 is an efficient design for use in conjunction with cyclic codes. The MAP decoder for cyclic codes 128 is structurally connected as follows. A sampled received or data signal having a sequence of digitally coded phase shifts is fed into an arctangent circuit 130, which provides sampled phase input to a data sample input buffer 132. Note that for the illustrated MAP decoder 128, the hypothesized amplitude A and sampled received signal amplitude $|r(i\Delta,|$ are assumed to be constant and are, therefore, not shown.

The input data from the buffer 132 is fed into a data sample shift register 134 and the MAP phase estimator 108. The data shift register 134 feeds sample data to a generalized cross correlator 136. The generalized cross correlator 136 also receives MAP phase estimates $\hat{\theta}_k$ from a MAP phase shift register 138, receivably connected to the output of the MAP phase estimator 108, and prior mean phases $\underline{\theta}_{MK}$, representative of the k possible coded signals, from a recirculating prior mean phase shift register 140. The output of the generalized cross correlator 136, is the MAP likelihood function result correlating the input phase sequence with each of the K hypothesized coded signals. Although not shown in FIG. 2, ultimately the MAP decoder 128 must compare the K correlations and identify the input phase sequence to be the coded signal with the highest value statistic.

The MAP estimator 108 can be applied to demodulation of digital communication signals if the block of phase samples coincides with a coded signal, i.e., a sequence of phase shifts corresponding to a transmitted symbol or digit. The prior mean phase values $\underline{\theta}_m$ correspond to the phase samples of the hypothesized coded signal. The autocovariance function $R_0[(i-j)\Delta]$ corresponds to the covariance matrix $C_0$ of the prior phase distribution.

The MAP demodulator is a generalized version of the estimator-correlator (H. L. Van Trees, *Detection, Estimation, and Modulation Theory, Part I*, Wiley, New York, 1968) as in Equation (11) above, such that MAP phase estimates $\{\hat{\theta}(k\Delta)\}$ are correlated not only with corresponding preliminary phase estimated $\{\alpha(k\Delta)\}$ extracted from incoming data as in Equation (12) but also with $C_0^{-1}\underline{\theta}_m$. The hypothesized coded signal with the largest generalized estimator-correlator output $l_{MAP}$ is chosen as the most likely transmission.

The MAP demodulator 100 (FIG. 1) is a generalization of a standard maximum likelihood (ML) demodulator. The ML demodulator correlates estimated phase values (or the corresponding in-phase and quadrature components I,Q) with hypothesized phase values $\underline{\theta}_m$ (or the corresponding I,Q components) for each hypothesized coded signal. The hypothesized coded signal with maximum correlator output is chosen as the most likely transmission. MAP and ML demodulators are identical in the limit as $R_0[(i-j)\Delta]$ becomes very small for all i–j, corresponding to a prior phase distribution that is concentrated at $\underline{\theta}=\underline{\theta}_m$. In this case, the reference signal becomes known instead of random, leading to a standard correlation receiver. The corresponding MAP phase estimate becomes $\hat{\underline{\theta}}=\underline{\theta}_m$.

An ML receiver, which is not shown in FIG. 2, would require a cross correlator between shift register 140 and shift register 134. This correlation actually occurs in FIG. 2 when phase uncertainty as represented by $C_0$ becomes very small.

MAP demodulation is superior to ML when the transmitted phase is randomized, even when no noise is added. Randomized transmitted phase shifts may have correlated, random phase perturbations. Such perturbations are introduced by synchronization (timing) error, an uncompensated multipath component, or random phase errors introduced by local oscillator phase drift or transmitter/receiver motion (Doppler) effects.

The MAP estimator 108 for M-ary PSK (phase-shift keyed signals with M different permissible chip waveform phase shifts) uses each phase value in a hypothesized coded signal as an element of the prior mean phase vector $\underline{\theta}_m$. The estimator also uses corresponding amplitude and phase measurements obtained from received data. For the same data, different MAP phase estimates are obtained for different hypothesized coded signals. Each of these estimates is substituted into a reference signal for correlation with the original data. The resulting receiver performs better than a conventional ML processor for phase perturbed signals, but a different $\underline{\theta}_m$ vector and associated MAP phase estimate is needed for each coded signal hypothesis. If many coded signal hypotheses are implemented in parallel, receiver complexity for MAP estimator-correlator processing seems to be prohibitive.

A solution to the complexity problem is obtained by exploiting the cyclic property of many relevant block codes, including M-ary Reed-Solomon codes (J. G. Proakis, *Digital Communications*, 2nd ed., McGraw-Hill, New York, 1989, pp. 429–432; W. W. Peterson, *Error-Correcting Codes*, MIT Press, Cambridge, Mass., 1961, pp. 137–182). If a length N code is cyclic, a sequence of N–1 cyclic shifts of a given coded signal (e.g., $\underline{s}_1$) can be used to generate all the other signals ($\underline{s}_2, \ldots, \underline{s}_N$) in the code. For a unit cyclic shift to the right, the last element in a shift register containing $\underline{S}_1$ is moved to the first position, and all other elements are shifted to the right by one position. The length of each coded signal thus corresponds to the number of different codes N.

Any coded signal in a cyclic code of length N can be decoded with a single ML correlator by using the following procedure:

(1) Obtain the in-phase and quadrature components of each sample of the received signal, construct the corresponding amplitude and phase variables $|r(j\Delta)|=(I^2+Q^2)^{1/2}$ and $\alpha(j\Delta)=\tan^{-1}(Q/I)$, and store these quantities in an input buffer. After samples corresponding to an unknown coded signal of length N have been obtained, transfer the samples to a data shift register. The data shift register is to be used for correlation of stored data samples with corresponding signal samples that are stored in a reference signal shift register.

(2) Assuming that the first coded signal corresponds to a sampled signal of the form $s_1(i\Delta)=A\exp[j\theta_m(i\Delta)]$, i=1,2..., N, store the $\underline{\theta}_m$ vector with elements $\theta_m(\Delta), \ldots, \theta_m(N\Delta)$ in an N-sample recirculating signal shift register.

(3) Cross correlate samples in the data shift register with signal samples obtained by cyclic shifting of $\underline{\theta}_m$, for shifts of 0, ..., N–1. For k shifts, the cross correlation function is $$l_{ML}(k) = \frac{\sum_{i=1}^{N} |r(i\Delta)|e^{j\alpha(i\Delta)}Ae^{-j\theta_{mk}(i\Delta)}}{\left[\sum_{i=1}^{N} |r(i\Delta)|^2 \sum_{i=1}^{N} |A|^2\right]^{1/2}}$$

where $\theta_{mk}$ is a version of $\theta_m$ that has been cyclically shifted k times.

(4) Determine the shift m that yields maximum correlation, $$Re\{l_{ML}(m)\} = \max_{0 \leq k \leq N-1} Re\{l_{ML}(k)\},$$

and output the corresponding decision, viz., that coded signal m+1 was transmitted.

As shown in FIG. 2, the MAP estimator-correlator 128 uses samples $|r(i\Delta)|$ and $\alpha(i\Delta)$, i=1, ..., N, in the data shift register 134 and samples $\theta_{mk}(i\Delta)$, i=1, ..., N in the signal shift register 140 to compute via the MAP estimator 108 a vector of MAP phase estimates $\hat{\theta}_k$ corresponding to hypothesized coded signal k+1. The MAP phase estimates are obtained via steepest descent solution of a nonlinear integral equation with a Hopfield network that has convergence time $t_c$. The MAP phase estimates $\hat{\theta}_k$ are stored in a reference signal shift register 138 for a generalized correlator that computes the MAP likelihood function for the $k_{th}$ coded signal as follows:

$$l_{MAP}(k) = \ln[p(\underline{r}|\underline{\hat{\theta}}_k)p(\hat{\theta}_k|\theta_{mk})] \quad (14)$$

where the right hand side of Equation (14) is the same as Equation (11).

The MAP decoder 128 shown in FIG. 2 will process data in real time if N MAP phase vector estimates can be obtained within one coded signal duration, i.e., if $Nt_c \leq N\Delta$, or $t_c \leq \Delta$, where $t_c$ is the convergence time of the Hopfield MAP estimator. A delay of $Nt_c$ seconds is needed to allow the recirculating shift register 140 to cycle through all possible cyclic shifts. If $t_c \leq \Delta$, this delay is less than or equal to the time $N\Delta$ required to fill the N-sample input buffer with data samples pertaining to the next transmitted signal.

If a VLSI Hopfield network circa 1989 (A. Moopenn and A. P. Thakoor, "Programmable synaptic devices for electronic neural nets," Proc. 5th IASTED Int'l Conf. on Expert Systems and Neural Networks, Honolulu, Hi., Aug. 1989, pp. 36–40) with convergence time between one and ten microseconds is used, then $t_c \leq \Delta$ if maximum channel bandwidth $B=1/(2\Delta)$ is between 50 kHz and 500 kHz. Processing speed and corresponding channel bandwidth can be increased by using newer, faster Hopfield implementations or by processing a sequence of N-sample data blocks in parallel. For sufficiently short convergence time, the MAP decoder 128 shown in FIG. 3 requires only one Hopfield network and correlator for MAP demodulation of a code of arbitrary size. The only disadvantage is a processing delay of $Nt_c$ seconds, which increases linearly with the code length N.

Figure 3:
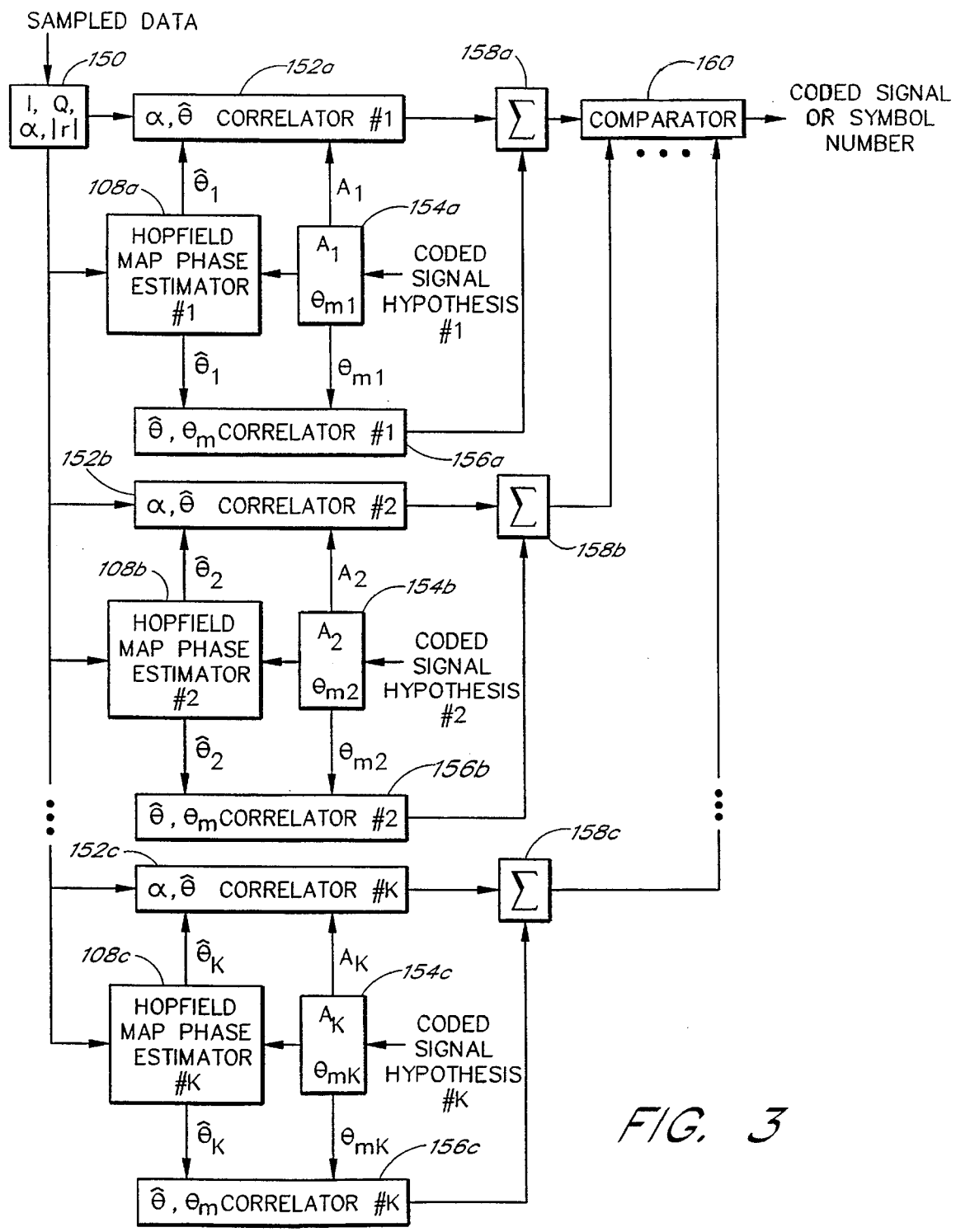
FIG. 3 is a block diagram of a set of generalized cross correlators for MAP decoding, i.e., for determining the most likely transmission for K coded-signal hypotheses.

FIG. 3 is a detailed block diagram of the generalized estimator-correlator 128, of the present invention, particularly showing the structure of the generalized cross correlator 136. The generalized cross correlator implements the statistic in Equation (11). Note that the construction of the decoder 128 requires K parallel circuits. Thus, there is one circuit per hypothesized coded signal. Note that for the special case of cyclic codes, the decoder 128 would only require one such circuit, as shown in FIG. 2.

In FIG. 3, in-phase and quadrature components $I(i\Delta)$ and $Q(i\Delta)$ are extracted from the received signal, and the resulting $I,Q|r(i\Delta)|=[I^2+Q^2]^{1/2}$ and $\alpha(i\Delta)=\arctan(Q/I)$ values may be stored at the data sample input buffer 132. The sampled signal is then distributed to the K parallel circuits at the data sample correlators 152 and the MAP phase estimators 108. (The first, second and kth circuits are indicated in FIG. 3 by the use of a, b, and c suffixes, respectively.)

Each coded signal hypothesis comprises an amplitude A and a mean phase $\theta_m$ which are stored in a hypothesized coded signal data register 154. The coded signal data register 154 feeds the data sample correlator 152, the MAP phase estimator 108 and a mean phase correlator 156. The MAP phase estimator 108 provides a block of phase estimates $\hat{\underline{\theta}}$ to the correlators 152, 156.

The correlated values from the correlators 152, 156 are fed into a summing amplifier 158. The result of each summation is the MAP likelihood statistic $l_{MAP}$. Each of the K calculated statistics is fed into a comparator where the highest value identifies the received data as one of the hypothesized coded signals.

In the generalized estimator-correlator 128 of FIG. 3, the sampled data at time $i\Delta$ is $y(i\Delta)=|r(i\Delta)|\exp[j\alpha(i\Delta)]$. $I(i\Delta)$ and $Q(i\Delta)$ are extracted as previously described.

$$|r(i\Delta)|^2 = I^2(i\Delta) + Q^2(i\Delta) \qquad \alpha(i\Delta) = \tan^{-1}[Q(i\Delta)/I(i\Delta)]$$
$$\cos[\alpha(i\Delta)] = I(i\Delta)/|r(i\Delta)| \qquad \sin[\alpha(i\Delta)] = Q(i\Delta)/|r(i\Delta)|.$$

The Hopfield MAP phase estimator 108 of FIG. 1 has $R_\theta[(i-j)\Delta]=[C_{\theta}]_{ij}$. $R_\theta[(i-j)\Delta]$ is the element in row i and column j of the phase covariance matrix $C_\theta$, where $C_\theta=E\{(\underline{\theta}-\underline{\theta}_m)(\underline{\theta}-\underline{\theta}_m)^T\}$. The simplest technique for estimating $R_\theta(.)$ or the phase covariance matrix is via decision feedback. If the column vector $\underline{\theta}_{mk}$ is the most likely coded signal and if $\hat{\underline{\theta}}_k$ is the corresponding MAP phase vector, then an estimate of $C_\theta$ is the sample covariance matrix corresponding to a weighted average of past versions of $(\hat{\underline{\theta}}-\underline{\theta}_{mk})(\hat{\underline{\theta}}-\underline{\theta}_{mk})^T$. The output of the Hopfield MAP phase estimator is a vector $\hat{\underline{\theta}}_k$ of MAP phase estimates corresponding to the $k^{th}$ coded signal hypothesis, i. e., to the symbol or coded signal $A_k(i\Delta)\exp[j\theta_{mk}(i\Delta)]$, i=1, ..., N. The $\underline{\alpha},\hat{\underline{\theta}}$ correlator 152 computes $$-\sum_{i=1}^{N} ||r(i\Delta)|\exp[j\alpha(i\Delta)] - \quad (15)$$

$$A(i\Delta)\exp[j\hat{\theta}_k(i\Delta)]|^2 = \sum_{i=1}^{N} \{A(i\Delta)[I(i\Delta)\cos\hat{\theta}_k(i\Delta) +$$

$$Q(i\Delta)\sin\hat{\theta}_k(i\Delta)] - |r(i\Delta)|^2 - A^2(i\Delta)\}$$

and the $\hat{\underline{\theta}},\underline{\theta}_m$ correlator 156 computes $$-(\hat{\underline{\theta}}_k-\underline{\theta}_{mk})^T C_\theta^{-1}(\hat{\underline{\theta}}_k-\underline{\theta}_{mk})=2\hat{\underline{\theta}}_k^T C_\theta^{-1}\underline{\theta}_{mk}-\hat{\underline{\theta}}_k^T C_\theta^{-1}\hat{\underline{\theta}}_k-\underline{\theta}_{mk}^T C_\theta^{-1}\underline{\theta}_{mk}.$$
(16)

It will be recognized that the present invention can be implemented in a variety of different ways. As but one example, the demodulator could be implemented using integrated circuit components, including a significant amount of digital logic, but the Hopfield network would preferably be constructed using analog circuitry, requiring appropriate D/A and A/D conversion, to achieve a fast rate of convergence of course, standard engineering techniques allow for implementations tending to emphasize computer, optical, electrical, or other methods, with engineering and economic trade-offs restricting each implementation as a practical matter.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A maximum a posteriori decoder, comprising:

a data sample input buffer receiving a plurality of samples of a received signal;

a data sample shift register receivably connected to the data sample input buffer;

a mean phase shift register storing a plurality of mean phases each indicative of a unique coded signal;

a maximum a posteriori phase estimator receivably connected to the data sample input buffer and the mean phase shift register, said estimator generating a plurality of phase estimates;

a phase estimate shift register receivably connected to the phase estimator; and a generalized cross correlator receivably connected to the data sample shift register, the mean phase shift register and the phase estimate shift register, said cross correlator generating a likelihood statistic for each unique coded signal.

2. The maximum a posteriori decoder defined in claim 1, wherein each of the samples comprises the phase of a chip, where a chip is defined as a short, constant frequency waveform comprising part of a received signal.

3. The maximum a posteriori decoder defined in claim 1, wherein each of the samples comprises an amplitude $|r(i\Delta)|$ and a phase $\alpha(i\Delta)$, $i=1, \ldots, N$.

4. The maximum a posteriori decoder defined in claim 1, wherein the mean phase shift register cycles through all possible cyclic shifts in $Nt_c$ seconds, wherein N is the number of mean phases and $t_c$ is the convergence time of the maximum a posteriori phase estimator.

5. The maximum a posteriori decoder defined in claim 1, wherein the generalized cross correlator computes the maximum a posteriori likelihood function for the $k_{th}$ coded signal as follows:

$$l_{MAP}(k)=\ln[p(\underline{r}|\hat{\underline{\theta}}_k)p(\hat{\underline{\theta}}_k|\underline{\theta}_{mk})]$$

where $\underline{r}$=the complex data vector associated with the received signal;

$\underline{\theta}_{mk}$=the mean phase vector for the $k^{th}$ coded signal;

$\hat{\underline{\theta}}_k$=the vector of chip phase shifts corresponding to a $k^{th}$ hypothesized transmitted signal for direct sequence, spread spectrum communication.

6. The maximum a posteriori decoder defined in claim 1, wherein the generalized cross correlator includes: a data sample correlator for correlating each phase sample and phase estimate, a mean phase correlator for correlating each mean phase and phase estimate, and a summer receivably connected to the data sample correlator and the mean phase correlator to output the likelihood statistic.

7. The maximum a posteriori decoder defined in claim 1, wherein the maximum a posteriori phase estimator includes a Hopfield network.

8. A method of maximum a posteriori (MAP) decoding of a signal to generate a maximum a posteriori likelihood function for a plurality of coded signals, the method comprising the steps of:

receiving a signal;

sampling in-phase and quadrature components of the received signal;

estimating MAP phase estimates $\hat{\underline{\theta}}$ of the received signal from the sampled signal components;

obtaining prior mean phases $\underline{\theta}_{mk}$ for a $k^{th}$ coded hypothesized transmitted signal; and cross-correlating $\hat{\underline{\theta}}$ and $\underline{\theta}_{mk}$ to obtain a MAP likelihood statistics for each $k^{th}$ coded signal.

9. The method of MAP decoding defined in claim 8, wherein each MAP phase estimator is parameterized by a time series of phase samples $\alpha(j\Delta)$, and a time series of sample amplitudes $|y(j\Delta)|$, $j=1, \ldots, N$.

10. The method of MAP decoding defined in claim 8, wherein the cross-correlating step includes the steps of:

correlating each data sample with a corresponding one of the phase estimates;

correlating each prior mean phase with a corresponding one of the phase estimates; and summing the data sample and prior mean correlations to calculate each MAP likelihood statistic.

11. The method of MAP decoding defined in claim 10, additionally comprising the step of comparing the MAP likelihood statistics to identify the highest MAP likelihood statistic.

12. A maximum a posteriori decoding system, comprising:

means for receiving a plurality of samples of a received signal;

means for storing the received signal samples receivably connected to the receiving means;

first shift means for storing and shifting a plurality of sampled phases receivably connected to the signal storage means;

second shift means for storing and shifting a plurality of mean phases each indicative of a predetermined coded signal;

means for generating a plurality of phase estimates receivably connected to the signal storage means and the mean phase storage means;

third shift means for storing and shifting a plurality of phase estimates receivably connected to the phase estimate generating means; and means, receivably connected to the phase estimate storage means, the sampled phase storage means, and the mean phase storage means, for generating a likelihood statistic for each predetermined coded signal.

13. The maximum a posteriori decoding system defined in claim 12, additionally comprising means for comparing the likelihood statistic for each unique coded signal hypothesis and determining the highest likelihood statistic.

14. A maximum likelihood correlator, comprising:

a sampling circuit receiving a coded signal;

an arctangent circuit receivably connected to the sampling circuit;

an amplitude circuit receivably connected to the sampling circuit;

an input buffer receivably connected to the arctangent circuit and the amplitude circuit;

a data shift register receivably connected to the input buffer;

a recirculating signal shift register storing a prior mean phase $\underline{\theta}_m$ vector with elements $\underline{\theta}_m(\Delta), \ldots, \theta_m(N\Delta)$;

a cross-correlator receivably connected to the data shift register and the recirculating signal shift register, said cross-correlator generating a likelihood statistic of the coded signal with respect to each prior mean phase.

15. The maximum likelihood correlator defined in claim 14, wherein the arctangent circuit calculates the phase variable $\alpha(j\Delta)$ of the coded signal, $j=1, \ldots, N$.

16. The maximum likelihood correlator defined in claim 14, wherein the amplitude circuit calculates the amplitude variable $|r(j\Delta)|$ of the coded signal, $j=1, \ldots, N$.

17. The maximum likelihood correlator defined in claim 14, wherein the input buffer stores the phase variable $\alpha(j\Delta)$ and the amplitude variable $|r(j\Delta)|$, $j=1, \ldots, N$.

18. The maximum likelihood correlator defined in claim 14, wherein the data shift register receives the phase variable $\alpha(j\Delta)$ and the amplitude variable $|r(j\Delta)|$ from the input buffer after N samples of the coded signal have been obtained, $j=1, \ldots, N$.

19. The maximum likelihood correlator defined in claim 14, wherein the cross correlator correlates samples in the data shift register with signal samples in the recirculating signal shift register using the function for k shifts as follows:

$$l_{ML}(k) = \frac{\sum\limits_{i=1}^{N} |r(i\Delta)|e^{j\alpha(i\Delta)}Ae^{-j\theta_{mk}(i\Delta)}}{\left[\sum\limits_{i=1}^{N} |r(i\Delta)|^2 \sum\limits_{i=1}^{N} |A|^2\right]^{1/2}}$$

where $\underline{\theta}_{mk}$ is a version of $\underline{\theta}_m$ that has been cyclically shifted k times, $0 \leq k \leq N-1$.

20. The maximum likelihood correlator defined in claim 19, wherein the shift m, m=k, that yields maximum correlation is calculated as follows:

$$Re\{l_{ML}(m)\} = \max_{0 \leq k \leq N-1} Re\{l_{ML}(k)\}.$$

* * * * *